Jan. 9, 1945.　　　M. L. GOLDBERT　　　2,366,963
DISPENSING DEVICE
Filed Oct. 9, 1943
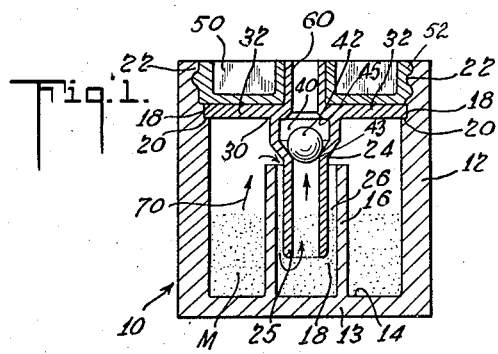
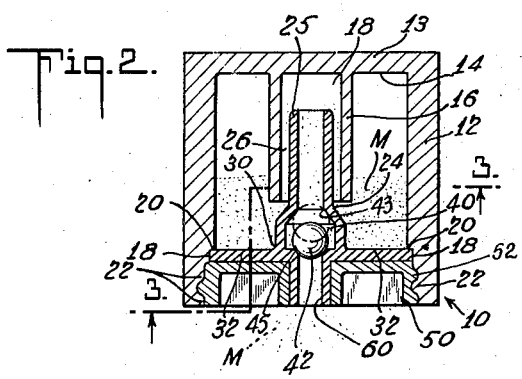
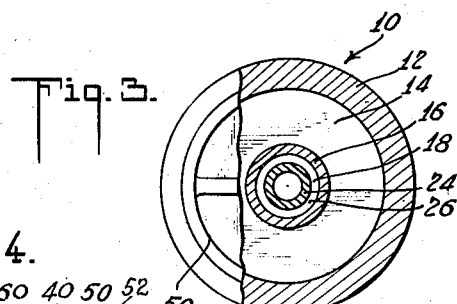
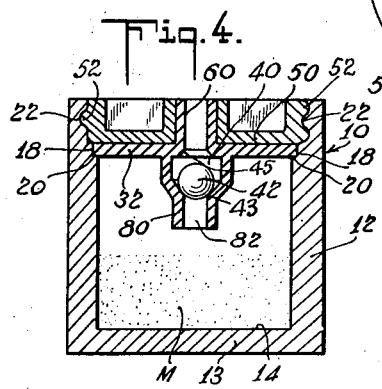
INVENTOR.
MAX L. GOLDBERT
BY
*Schaines and Liberman*
ATTORNEYS Patented Jan. 9, 1945

2,366,963

UNITED STATES PATENT OFFICE 2,366,963

DISPENSING DEVICE

Max L. Goldbert, New York, N. Y.

Application October 9, 1943, Serial No. 505,704

4 Claims. (Cl. 65—57)

My invention relates to dispensing devices, and particularly to a device for dispensing powdered, granular, or crystalline materials, such as pepper, salt, cinnamon and the like. My invention, of course, it not to be limited to the material it may be used to dispense.

The main object of my invention is the provision of a dispensing device in which the air is substantially excluded from contact with the material within the dispenser when the device is not in use, so that the material will not be affected by the moisture content of the air.

Another object of my invention is the provision of a dispensing device wherein the contents are normally sealed against the atmosphere when the device is not in use, and wherein the seal may be intermittently broken and remade to permit access of the atmosphere to the contents and flow of the contents out of the container.

A further object of my invention is the provision of a dispenser comprising a casing, a closure therefor, a hollow shaft apertured at both ends, one end of which projects into the casing, the other end of which projects through the closure, a cage in said shaft and a trapped ball in said cage below the level of the closure.

Another object of my invention is the provision of a dispenser comprising a container, a compartment within the container, a hollow shaft disposed within the compartment, means to secure said hollow shaft in spaced relation to the bottom of the compartment and means within the shaft to control contact between the atmosphere and the container contents, and flow of the container contents out through the shaft.

Another object of my invention is the provision of a dispensing device comprising a container, and a compartment within the container, a hollow shaft concentric with the compartment and projecting partly therein, a cage within the shaft wherein a trapped ball is located which, when the dispenser is in one position, seals the compartment, and which, when the dispenser is reversed, opens the secondary compartment to the atmosphere.

A further object of my invention is the provision of a dispensing device comprising a receptacle and a closure therefor, a main chamber in the receptacle and an upwardly open compartment therewithin, a hollow elongated shaft projecting partially into the compartment, and upwardly thereof, means to support same in spaced relation to the bottom of the compartment, means to secure the supporting means, and means within the shaft to control the passage of dispenser contents therethrough, which means are operable upon agitation of the device.

Other and further objects of my invention will be obvious and still others pointed out specifically in connection with the following description of an illustrative embodiment.

In the drawing annexed hereto, forming a part hereof,

Figure 1 is a vertical section through one form of device constructed according to and embodying my invention, the device being shown at rest;

Fig. 2 is a similar view showing the device in use, reversed 180° with respect to Figure 1, Fig. 3 is a section on the line 3—3 of Fig. 2; and Fig. 4 is a view similar to Fig. 1 of a modified form of device, also constructed according to and embodying my invention.

My device, in both modifications shown, is indicated generally by reference numeral 10 and may comprise a circular cylindrical casing 12 open at one end, and closed at the other end 13. Casing 12 may be formed as by molding, casting or stamping of any suitable material, metallic, plastic, etc., and, within my invention, may be of any desired shape, the circular form shown and described here being merely illustrative. Projecting upwardly from floor 14 of casing 12, I provide an annular wall 16 which extends past the center thereof, defining a circular well or compartment 18 within casing 12. As seen in Figs. 1 and 2, the inside of the casing wall is cut away or stepped as at 18 to provide a ledge or seat 20. Female threads 22 are formed within the casing from immediately above seat 20 to the top of the container.

I provide a hollow circular shaft 24, open at both its upper end 60 and its lower end 25, of such diameter as to fit into well or compartment 18, leaving substantial clearance, as indicated at 26, between the outside of shaft 24 and the inside of wall 16. I support shaft 24 within the casing, with the bottom 25 thereof spaced upwardly of container floor 14, by means of a spider 30. Spider 30 may be formed integral with shaft 24 or secured thereto, the spokes 32 thereof extending outwardly from the shaft and resting on shelf 20, limiting the extent of penetration of shaft 24 into well or compartment 18. A cage 40 is formed within shaft 24, below spider 30 and above receptacle 18, by distension of the walls thereof, within which cage a trapped ball 42 is located, of diameter larger than the diameter of shaft 24 above the spider and below the cage. Ball 42 may seat against both ends of the cage to seal shaft 24, in response to the position in which the casing is placed.

I provide a cover 50, centrally apertured so as to receive the top of shaft 24 therethrough, and provided with male threads 52 to engage the female threads 22 of casing 12, and after spider 30 is rested on shelf 20, it may be locked thereon by cover 50, as indicated. Cover 50 is imperforate except for the central opening above referred to, and while spider 30 may comprise a continuous plate, it preferably consists of an annular ring connected to the shaft by means of spokes as 32, the desiderata in this connection being the provision of means to locate and support shaft 24 with respect to well 18. While I have shown shaft 24 and spider 30 as one element, and cover 50 as another element, they may be formed as one; that is, the shaft and cover 50 may be formed as one unit.

In operation, the material to be dispensed, indicated by M, is poured into the casing after the cover is removed. Some of the material M may fall into well or receptacle 18. When cover 50 is replaced and the device set in the position shown in Fig. 1, ball 42 will drop by gravity against seat 43 sealing the interior of the receptacle against the atmosphere, so that the material to be dispensed will not be affected by moisture conditions or any other adverse atmospheric conditions.

When it is desired to dispense the material within the receptacle, it is reversed into the position of Fig. 2 and agitated in a vertical line. As the device is shaken and material M thrown about, some of the grains or crystals, etc., M will drop within well 18 and into open end 25 of shaft 24 and as ball 42 is shifted back and forth the material will sift out past ball 42 through mouth 60 as indicated. In this way, a relatively small amount of material is dispensed each time, following the path indicated by line 70.

When the device is rested in the position of Fig. 2, ball 42 will drop by gravity against seat 45 and seal the contents against atmospheric conditions. Thus, in both the up position, and the down position, there is provision within shaft 24 to seal the contents and to control the flow of dispensable material out of the interior, it being necessary to agitate the device to unseal the shaft 24 to permit egress through opening 60.

In the modification of Fig. 4, I have eliminated the well 18 formed by wall 16. My shaft 80 also has cage 40 and trapped ball 42 therewithin, and seats or shoulders 43 and 45 to receive the ball for shaft sealing purposes. In this modification a faster flow is provided since I have eliminated the path as 70 to be followed by the material M, mere reversal or slight agitation of the device being sufficient to cause flow through open end 82 into cage 40 and past ball 42. Here again, while I have shown the shaft and spider as one element and the cover as another, they may be combined and formed as one unit.

Having described my invention what I claim and desire to secure by Letters Patent is:

1. A dispenser comprising a receptacle, a closure therefor, a well within said receptacle the top of which is below the top of the receptacle, a hollow shaft projecting into said well and out of the receptacle through the closure, means to support the shaft in spaced relation to the well floor, communication between the receptacle and the well, and between the shaft and the well, and means to seal the shaft when the receptacle is at rest and to intermittently open the same when the receptacle is agitated.

2. A dispenser as in claim 1 in which the shaft has an enlarged cage therein, a seat at the top of the cage and a seat at the bottom thereof, a trapped ball within said cage to fit the top seat and seal the shaft when the dispenser is in one position, said trapped ball fitting the bottom seat to seal the shaft when the dispenser is reversed.

3. A dispenser comprising an open ended casing and a closure therefor, the casing having a well therewithin defined by an annular wall upstanding from the casing floor, a communication between the casing and the well, an open ended hollow shaft and means to support same in spaced relation to the casing floor, one end of the shaft fitting into the well, a passageway between the well wall and the shaft, the other end of the shaft projecting through the closure in communication with the atmosphere, a passageway through the shaft and means to close same when the disepenser is at rest and to intermittently open same when the dispenser is agitated.

4. A dispenser as in claim 3 in which the casing is notched at the top thereof to provide an annular internal shoulder, and the means to support the hollow shaft in spaced relation to the casing floor comprise an annular ring secured to the shaft resting on the shoulder.

MAX L. GOLDBERT.